United States Patent
LaBotz

[11] 3,925,983
[45] Dec. 16, 1975

[54] TRANSPIRATION COOLING WASHER ASSEMBLY

[75] Inventor: Richard J. LaBotz, Fair Oaks, Calif.

[73] Assignee: The United States of America as represented by the Secretary of the Air Force, Washington, D.C.

[22] Filed: Apr. 17, 1974

[21] Appl. No.: 461,670

[52] U.S. Cl. .................. 60/265; 60/267; 60/258; 60/260
[51] Int. Cl.² .......................................... F02K 11/02
[58] Field of Search ............ 60/265, 267, 258, 260; 138/43; 251/208

[56] References Cited
UNITED STATES PATENTS

| | | | |
|---|---|---|---|
| 3,413,704 | 12/1968 | Addoms et al. | 60/258 |
| 3,532,126 | 10/1970 | Boothe | 138/43 |
| 3,532,127 | 10/1970 | Vogelsang et al. | 138/43 |
| 3,585,800 | 6/1971 | Kuntz et al. | 60/265 |
| 3,615,054 | 10/1971 | LaBotz | 60/258 |

*Primary Examiner*—C. J. Husar
*Assistant Examiner*—O. T. Sessions
*Attorney, Agent, or Firm*—Joseph E. Rusz; Jacob N. Erlich

[57] ABSTRACT

A transpiration cooling washer assembly having a relatively thin washer element in which a pattern of holes is etched completely through to define a primary slot for metering coolant and a plurality of secondary metering slots, which is assembled on top of a relatively thicker washer element having a pattern of channels etched only partially therethrough. The slots within the thin washer element forms the coolant flow control passages while the thicker washer element provides the coolant distribution plenums and manifold areas. The unitary two-part washer design provides for selectively choosing a desired hydraulic resistance simply by rotating the two washer elements with respect to each other at time of assembly.

4 Claims, 4 Drawing Figures

TRANSPIRATION COOLING WASHER ASSEMBLY

BACKGROUND OF THE INVENTION

This invention relates generally to transpiration cooling, and more particularly, to the stacked washer type of transpiration cooled rocket engine.

In the past devices such as thrust chambers were cooled with regenerative cooling techniques. This technique, however, leaves much to be desired since it is susceptible to wall failures due to the erosion in regions where the heat transfer conditions are severe. In fact local melting or erosion of a small area of the surface of the chamber can cause a complete failure of the chamber wall since high-pressure coolant within a coolant tube will erupt through the failure opening. Transpiration cooling has been recognized to be an effective method of cooling chambers under severe heat transfer operating conditions. Such transpiration cooling is basically a process whereby a surface, vessel, wall, container or the like in contact with heat energy with a temperature above the capabilities of the material forming the surface, is kept cool by the flow of a coolant fluid through the material toward the heating source. One of the primary advantages offered by a stacked washer type of transpiration cooled rocket engine is the high degree of control over the axial distribution which this concept affords.

To take full advantage of the stacked washer concept it is necessary to employ washers of many different hydraulic resistances. With conventional washer design, the many different hydraulic resistances are obtained by making washers with different length metering grooves. These washers although very similar in appearance must be produced separately in an expensive operation and furthermore necessitates the manufacture of a significant number of different parts in order to make a single transpiration cooled engine.

SUMMARY OF THE INVENTION

The instant invention sets forth a transpiration cooling washer assembly which utilizes a single washer design to provide the many different hydraulic resistances. With this invention the number of different parts required to form a stacked washer transpiration cooled engine can be significantly reduced without any compromise in the hydraulic or thermal design. This reduction in the number of different parts required not only results in a substantial cost savings but also makes feasible the use of entirely different washer fabrication techniques.

The washer assembly of this invention is in the form of a single washer constructed of two pieces. One of the pieces is of a thin material having holes etched completely through and the other piece is of a thick material with holes being etched partially therethrough. The thin piece of material is laid on top of the thick piece and the clear through passages within the thin washer form the coolant flow control passages while the passages etched partially through the thicker washer form the distribution plenums and manifold areas.

Within the thin washer element a primary metering slot is etched completely therethrough and has a length as long as the greatest length required in the particular engine design. In addition, a plurality of secondary metering slots are also etched therethrough. In the assembled condition with the thin washer element mounted on the top of the thick washer element the effective length of the primary metering groove is controlled by controlling the angular position of the thin element with respect to the thick elements. In order to align the secondary metering slots with the distribution plenum and manifold areas of the thicker washer element the various parts may be indexed and the rotation of the parts may be varied by finite increments so that the secondary metering slots are always centered with respect to the manifold areas.

It is therefore an object of this invention to provide an improved transpiration cooling washer assembly.

It is another object of this invention to provide a transpiration cooling washer assembly which is economical to produce and which utilizes conventional currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENT

Figure 1:
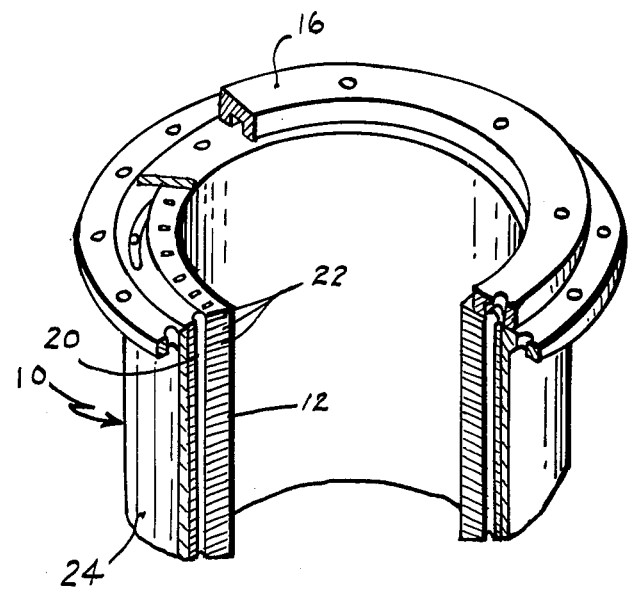
FIG. 1 represents a pictorial view of a portion of a transpiration cooled rocket engine.

Reference is now made to FIG. 1 of the drawing which shows in pictorial fashion a segment of a conventional transpiration cooled thrust chamber 10 of the type illustrated in U.S. Pat. No. 3,585,800 issued, as a co-inventor, to the inventor of this application. Thrust chamber 10 shows the cylindrical section having an inside face 12 which resembles a porous wall, containing many thousands of small openings or holes 14 which are in the order of several thousandths of an inch across and are arranged in a precise predetermined order. Holes 14 have hydraulic diameters of 0.0005 inch to 0.020 inch; a typical size being 0.004 inch. Each hole is in fluid communication with a manifold 16 by means of a plurality of elongated flow tubes 18 (as best shown in FIG. 2) and which run the length of thrust chamber 10 through aperture 20 in a manner to be described hereinbelow.

Transpiration cooled thrust chamber 10 is usually made of a stack of a large number of thin washers or wafers 22 whose inner periphery defines the inside diameter of the thrust chamber 10. The washers or wafers 22 are located within an exterior housing 24 which forms an outer shell for thrust chamber 10 and which defines the outer diameter of the chamber.

Figure 2:
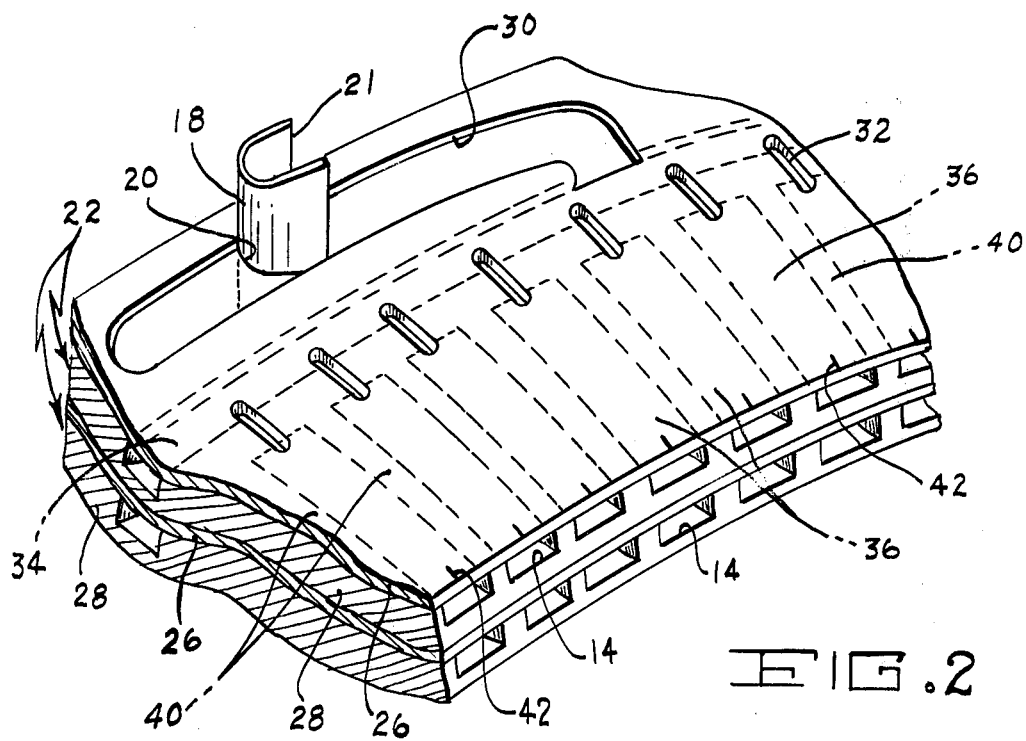
FIG. 2 represents a pictorial view of the assembled transpiration cooling washer assembly of this invention.
Figure 3:
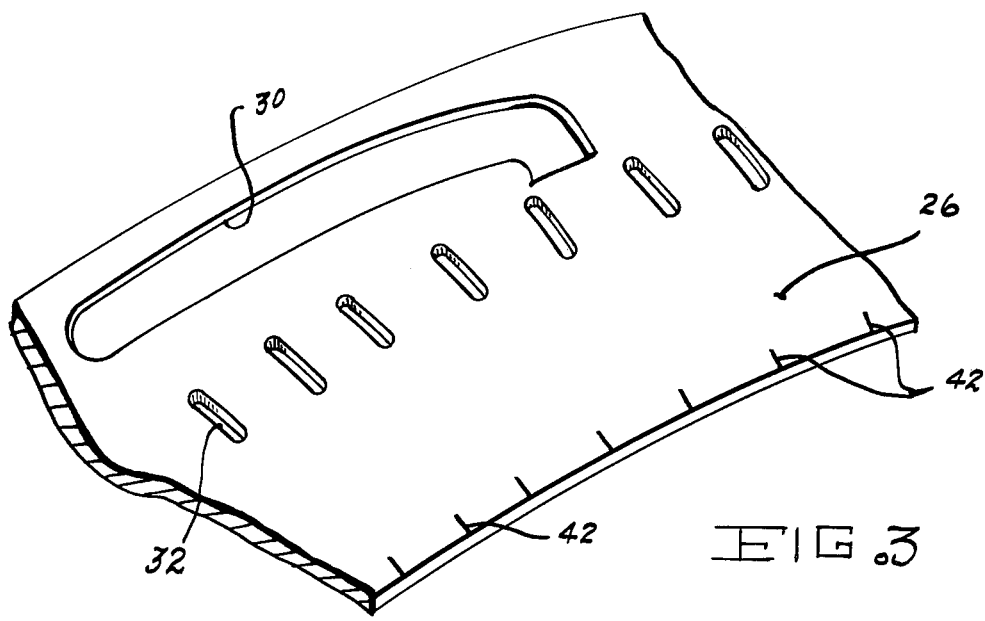
FIG. 3 represents a pictorial view of the thin or top washer element of the transpiration cooling washer assembly of this invention.
Figure 4:
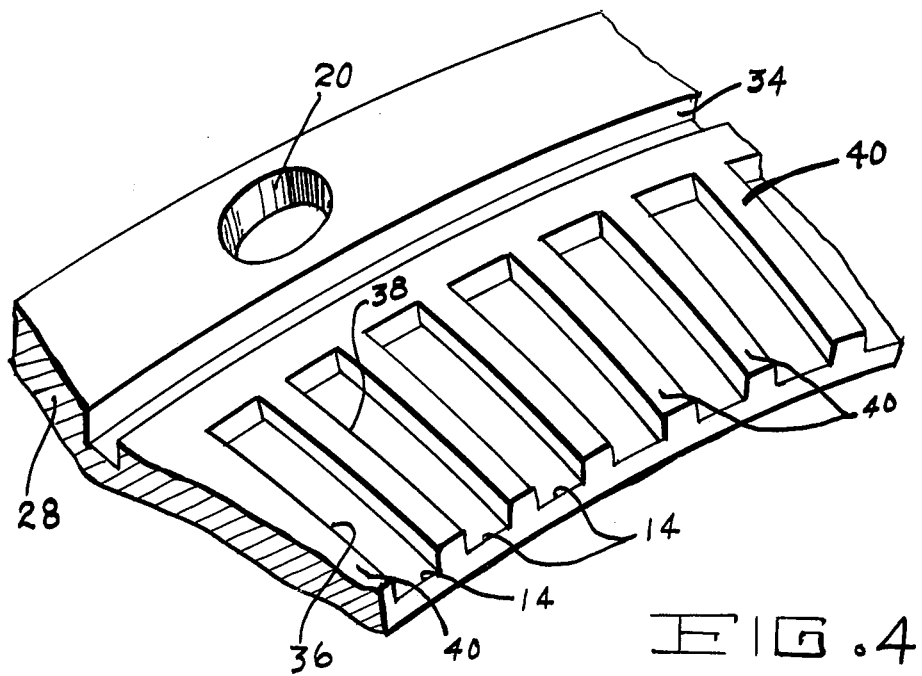
FIG. 4 represents a pictorial view of the thicker or bottom washer element of the transpiration cooling washer assembly of this invention.

Referring to FIGS. 2–4, the instant invention is directed to the washer or wafer portion of the transpiration cooled thrust chamber 10. Washer 22 is constructed of two washer elements of suitable high strength and temperature resistant material 26 and 28. Washer element 26 is the thinner of the two pieces and has etched completely therethrough a primary metering slot 30 and a plurality of secondary metering slots 32 for receiving and directing fluid flow from tube 18. Primary slot 30 is of an elongated configuration while secondary slots 32 are circumferentially spaced within washer element 26 and are positioned adjacent primary slot 30 in a manner to be described hereinbelow. The thicker piece or washer element 28 has etched partially therethrough a circumferentially spaced flow control passage 34 and a plurality of radially extending flow control passages 36 which terminate in coolant flow openings 14 at one end thereof. In the assembled position thin washer element 26 is fixedly secured to the top of thick washer element 38 by any suitable securing means such as welding so as to form the completed washer or wafer 22 as shown in FIG. 2 of the drawing. Elongated flow tube 18 passes through primary metering slot 30 as well as through aperture 20 thereby clearly defining the effective length of metering slot 30. Because of tube 18 being open at one side 21 thereof the flow of fluid readily passes on to primary metering slot 30, thus substantially reducing turbulence related to the different effective lengths of metering slot 30.

The instant invention provides a washer 22 having variable hydraulic resistance from a single washer design. This is accomplished by forming the primary metering slot 30 as long as the greatest length required in a particular engine design and by controlling the effective length of this metering slot 30 by controlling the angular position of thin washer element 26 with respect to thick washer element 28, and in particular, with respect to aperture 20 located therein. As can be seen from FIGS. 2–4 the metering groove length can be increased by rotating washer element 26 in a clockwise direction relative to element 28 while it can be decreased by movement in the counter-clockwise direction relative to element 28.

It is also essential in the mounting or positioning of washer element 26 on top of washer element 28 that the metering slots 32 when in its final position operably connect flow control channel 34 to channels 36. In other words, it is undesirable to have metering slots 32 rest upon the elevated portions 40 of thick washer element 28, for in this position there can be no flow between the primary metering slot 30 and openings 14. In order to alleviate this problem it is necessary to index thin washer element 26 with a series of marks 42 aligned with each metering slot 32, respectively, so that when positioned upon thick washer 28 these marks are located above the central portion of openings 14.

The metering slots and flow control passages of individual washer elements 26 and 28 may be formed in a plurality of ways, one such method being the photoetching process. In this way it is possible to easily limit the depth of the various flow control channels. It should, however, be realized that many inexpensive methods may now be utilized in the manufacture of washers 22 of this invention since it is no longer critical that each metering slot be of varying effective lengths. Mass production becomes easy and extremely economical since all elements 26 and 28 of washer 22 are identical with only their subsequent mounting being the determining factor for the effective length of the primary metering slot 30.

In operation any suitable coolant such as $N_2O_4$, $ClF_3$ or gaseous or liquid hydrogen may be used as well as an inert coolant such as water. This coolant is introduced into the elongated flow tube 18 through manifold 16 and from there is distributed to the primary metering slots 30. The coolant then flows into coolant flow passage 34 and from there through secondary slots 32 to channels 36 and out through openings 14. Control of the flow of coolant through openings 14 is maintained by the positioning of elements 26 with respect to elements 28 and thereby by the effective length of primary metering slot 30. The completed washers 22 of this invention are stacked in the manner shown in FIG. 1.

Although this invention has been described with reference to a particular embodiment and in conjunction with a specific transpiration cooled rocket thrust chamber it should be understood to those skilled in the art that this invention is also capable of a variety of alternative embodiments within the spirit and scope of the appended claims.

I claim:

1. In a transpiration cooled device having a washer assembly and means for delivering coolant to said washer assembly operatively connected thereto, the improvement therein comprising a washer assembly having at least a first and second plate, said first plate having a primary metering slot of a predetermined size and at least one secondary metering slot therein, said primary and secondary metering slots extending completely through said first plate, said second plate having an aperture located therein capable of being operatively aligned with said primary metering slot in a plurality of positions, said aperture being of a size less than said predetermined size of said primary metering slot, a plurality of channels formed in said second plate operatively connected to said primary and said secondary metering slots, said plurality of channels extending only partially through said second plate, and said first plate being fixedly secured to said second plate in any of a number of predetermined positions with respect thereto thereby permitting different effective lengths of said primary metering slot, whereby coolant is delivered from said delivery means to said primary metering slot, from said primary metering slot to one of said channels, from there to said second metering slot and onto said remaining channels wherefrom said coolant is distributed in such a manner as to cool said device.

2. In a transpiration cooled device as defined in claim 1 further comprising an elongated tube protruding through said aperture, said tube being open on one side thereof and operatively connecting said coolant delivery means to said primary metering slot.

3. In a transpiration cooled device as defined in claim 2 wherein said first and second plate are of a circular configuration and said plurality of channels in said second plate are made up of one circumferentially located channel and a plurality of radially spaced channels.

4. In a transpiration cooled device as defined in claim 3 further comprising means located on said washer assembly for aligning said first plate with respect to said second plate.

* * * * *